United States Patent
Krueger et al.

(10) Patent No.: US 10,207,880 B2
(45) Date of Patent: Feb. 19, 2019

(54) DEVICE FOR EMPTYING AND THEN DISPOSING OF TRAYS FILLED WITH BROCHURES

(71) Applicant: Uhlmann Pac-Systeme GmbH & Co. KG, Laupheim (DE)

(72) Inventors: Andreas Krueger, Erbach (DE); Claus Alger, Biberach (DE); Volker Rafensteiner, Bihlafingen (DE); Andreas Russ, Schoenebuerg (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 674 days.

(21) Appl. No.: 14/712,628

(22) Filed: May 14, 2015

(65) Prior Publication Data
US 2015/0344243 A1 Dec. 3, 2015

(30) Foreign Application Priority Data
May 30, 2014 (EP) ..................................... 14170569

(51) Int. Cl.
| | | |
|---|---|---|
| *B65H 15/02* | (2006.01) | |
| *B65G 65/23* | (2006.01) | |
| *B65G 47/38* | (2006.01) | |
| *B65G 47/52* | (2006.01) | |
| *B65G 47/82* | (2006.01) | |
| *B65B 35/58* | (2006.01) | |
| *B65B 69/00* | (2006.01) | |

(52) U.S. Cl.
CPC .............. *B65G 65/23* (2013.01); *B65B 35/58* (2013.01); *B65B 69/00* (2013.01); *B65G 47/38* (2013.01); *B65G 47/52* (2013.01); *B65G 47/82* (2013.01); *B65G 2814/03* (2013.01)

(58) Field of Classification Search
CPC .... B07C 1/025; B65G 2207/46; B65G 65/23; B65H 2301/422542; B65H 15/02
See application file for complete search history.

(56) References Cited

U.S. PATENT DOCUMENTS

| | | | | |
|---|---|---|---|---|
| 4,005,792 | A * | 2/1977 | Schulman | ............... B07C 1/025 414/416.09 |
| 5,721,710 | A * | 2/1998 | Sallas | .................... G01V 1/375 367/38 |
| 9,782,802 | B2 * | 10/2017 | Berdelle-Hilge | ....... B07C 1/025 |

FOREIGN PATENT DOCUMENTS

| | | |
|---|---|---|
| DE | 202012000938 U1 | 3/2012 |
| EP | 1086628 A2 | 3/2001 |
| EP | 2439142 A1 | 4/2012 |

OTHER PUBLICATIONS

European Search Report for EP 14170569 (dated Jan. 12, 2014).

* cited by examiner

*Primary Examiner* — Mark C Hageman
(74) *Attorney, Agent, or Firm* — Brinks Gilson & Lione (57) ABSTRACT

The device for emptying and then disposing of trays filled with brochures comprises a feed device for transporting the filled trays in a transport direction and a turning device for rotating the trays. The turning device may comprise a slide, which is rotatable and thus movable back and forth along a U-shaped path between a receiving position to receive the trays, an emptying position in which the brochures are pushed out of the trays, and a disposal position, in which the empty trays are disposed of. The device may also comprise at least one pusher element to push the brochures out of the trays when the slide is in the emptying position, and conveying means for conveying the brochures which have been pushed out of the tray.

4 Claims, 11 Drawing Sheets

DEVICE FOR EMPTYING AND THEN DISPOSING OF TRAYS FILLED WITH BROCHURES

RELATED APPLICATIONS

The present patent document claims the benefit of priority to European Patent Application No. EP 14170569.9, filed May 30, 2014, the entire contents of which are incorporated herein by reference.

FIELD

The present disclosure relates to a device for emptying and then disposing of trays filled with brochures.

BACKGROUND

The statements in this section merely provide background information related to the present disclosure and may not constitute prior art.

In the pharmaceutical industry, it is standard practice to package large package inserts, also called brochures, inside a folding box or cylindrical container together with a packaged or bottled active ingredient.

Various methods and devices for doing this are known. In a first method, the brochures are folded by a folding device and sent directly to the packaging process.

In a second method, the brochures are delivered prepackaged in so-called trays. The brochures must be taken out of, or unpacked from, the delivered trays before they can be sent to the packaging process. The unpacked brochures or the brochures taken from the tray are usually supplied to a storage shaft or magazine, in which the brochures are initially stored, and from which they are then integrated into the packaging process for the pharmaceutical article.

The trays can be emptied in various ways. A first possibility is to empty them manually, which necessarily encounters a limit with respect to throughput.

Semi-automatic transfer devices are also known, in which the trays are supplied manually and the brochures removed automatically from the trays. The disadvantages of these devices are that they occupy a great deal of space and require a large amount of manual work.

SUMMARY

The present disclosure provides a device for emptying and then disposing of trays filled with brochures, i.e., a device in which both the emptying of the trays and the disposal of the empty trays are carried out automatically, and which comprises a space-saving and compact structure, and also of providing a corresponding method for emptying and then disposing of trays filled with brochures.

According to an aspect of the disclosure, one device for emptying and then disposing of trays filled with brochures comprises a feed device for transporting the filled trays in a transport direction and a turning device for rotating the trays. The turning device comprises a slide, which is movable back and forth between a receiving position, an emptying position, and a disposal position, and which is also rotatable. The slide itself comprises a first guide element and a second guide element, which are guided around a substantially U-shaped path, which comprises a first leg and a second leg. When the slide is in the emptying position, the first guide element is positioned in an end area of the first leg; and when the slide is in the disposal position, the second guide element is positioned in an end area of the second leg. When the slide is in the receiving position, the first guide element and the second guide element are positioned between the two end areas. The device also comprises at least one pusher element for emptying the trays in the emptying position of the slide and a conveying means for conveying the brochures which have been pushed out of the tray.

With this configuration, a device for emptying and disposing of trays is created which comprises a space-saving and compact structure and which also makes it possible for the trays to be emptied and disposed of in an especially rapid and reliable manner.

To achieve a stable guidance of the guide elements, the substantially U-shaped path is preferably formed at least in part by a guide cam. The guide elements can be configured as rollers, which roll along the guide cam.

To implement the rotation process as simply as possible, the turning device may comprise a first drive and a second drive for rotating the slide, the two drives being actuatable independently of each other.

In one form, the rotation of the slide may be brought about by two pneumatic cylinders, wherein the first drive comprises the first pneumatic cylinder, and the second drive the second pneumatic cylinder, each of which is movable substantially vertically up and down.

The first pneumatic cylinder may be arranged in an area close to the feed device and the second pneumatic cylinder in an area of the turning device facing away from the feed device. As a result of this arrangement of the pneumatic cylinders, the slide can be easily rotated into the desired position.

The slide may comprise a support surface and a side wall projecting at an angle from that surface, wherein, in the area of the side wall, a receiving pocket is formed, in which the tray is held as it is being rotated. The receiving pocket prevents the tray from tipping over or falling off the support surface of the slide during the rotational movement.

The first and second pneumatic cylinders may comprise support elements, wherein the support element of the first pneumatic cylinder holds a pin, which is connected to the first guide element, and wherein the support element of the second pneumatic cylinder holds a rod, which is arranged in a transition area between the support surface and the side wall of the slide. This allows the drive and the slide to be easily connected and disconnected.

To allow in a simple manner the brochures to be pushed out of the trays, the at least one pusher element may be movable back and forth along a guide rail.

Two pusher elements may be provided to empty the trays, wherein the first pusher element is movable back and forth on a first guide rail, and the second pusher element can be movable back and forth on a second guide rail.

In this case, the first pusher element may be rotatable around a first rotational axis, which is substantially perpendicular to the transport direction, and the second pusher element may be rotatable around a second rotational axis, which is substantially parallel to the transport direction. The pusher elements can thus be flipped out of the way. In the case of the first pusher element, this means that there will be no interference with the process of rotating the turning device. The flipping of the second pusher element toward the side, in contrast, allows the pushed-out brochures to fall as desired.

The U-shaped path may comprise a straight base section, the length of which is substantially the same as the length of the first leg, so that, when the slide is in the receiving position, each of the two guide elements is positioned in a transition area between the associated leg and the base section. The support surface can thus be arranged on a horizontal plane and thus receive the trays being transported to it, and then the slide of the turning device can be easily rotated from the receiving position to the emptying position by the raising of the first guide element.

A container may be arranged underneath the turning device to receive the empty trays to be disposed of. The receiving surface of the slide, when in the disposal position, is thus emptied in fully automatic fashion and is ready to receive the next tray.

According to the present disclosure, a method for receiving, emptying, and then disposing of trays filled with brochures comprises the following steps:

feeding a filled tray in a transport direction to a slide of a turning device, which is in a receiving position;

subsequently rotating the slide in a first rotational direction by 60-120° to an emptying position and emptying the trays filled with brochures by pushing the brochures out of the tray in a direction especially perpendicular to the transport direction;

subsequently rotating the slide back in a second rotational direction opposite the first rotational direction past the receiving position to a disposal position, the slide thus having been rotated by 45-110° in the second rotational direction relative to the receiving position, so that the emptied tray falls from the slide; and subsequently rotating the slide back to the receiving position.

In this method, the only manual operation is the placing of the trays in the feed device, which results in higher productivity. In addition, as a result of the rotation of the slide back and forth between the various positions, the amount of space which is occupied is minimized.

To allow the trays transported into position by the feed device to be received properly by the support surface of the slide, the support surface of the slide may be arranged at an angle between −20° and +20°, and preferably at an angle of 0°, to the horizontal.

The slide, when in the emptying position, may be rotated in the first rotational direction by 70-110°, or by 80-100°, or by 85-95°, or by 90°, relative to the receiving position.

The slide, when in the disposal position, may be rotated in the second rotational direction by 45-105°, or by 45-90°, or by 60-90°, or by 65-80°, relative to the receiving position. Positioning the slide in this way when in the disposal position increases the reliability of the tray to be disposed of sliding off the support surface of the slide.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF SPECIFIC EMBODIMENTS

FIGS. 1-11 show the structure and function of one embodiment of the device according to the present disclosure. The trays 4 filled with brochures 2 or package inserts are usually laid manually in a feed device 6 and transported by the feed device 6 in a transport T to a turning device 8. The trays 4 must be opened by an operator before they are laid in the feed device 6. In the application described here, a narrow side 5 of the tray 4 (shown in FIGS. 8 and 9) is opened, and a cover on the top 7 of the tray 4 is removed. The brochures 2 are later pushed out of the open narrow side 5, and the open top 7 of the tray 4 allows a pusher element 30 to be introduced to push out the brochures 2.

Figure 1:
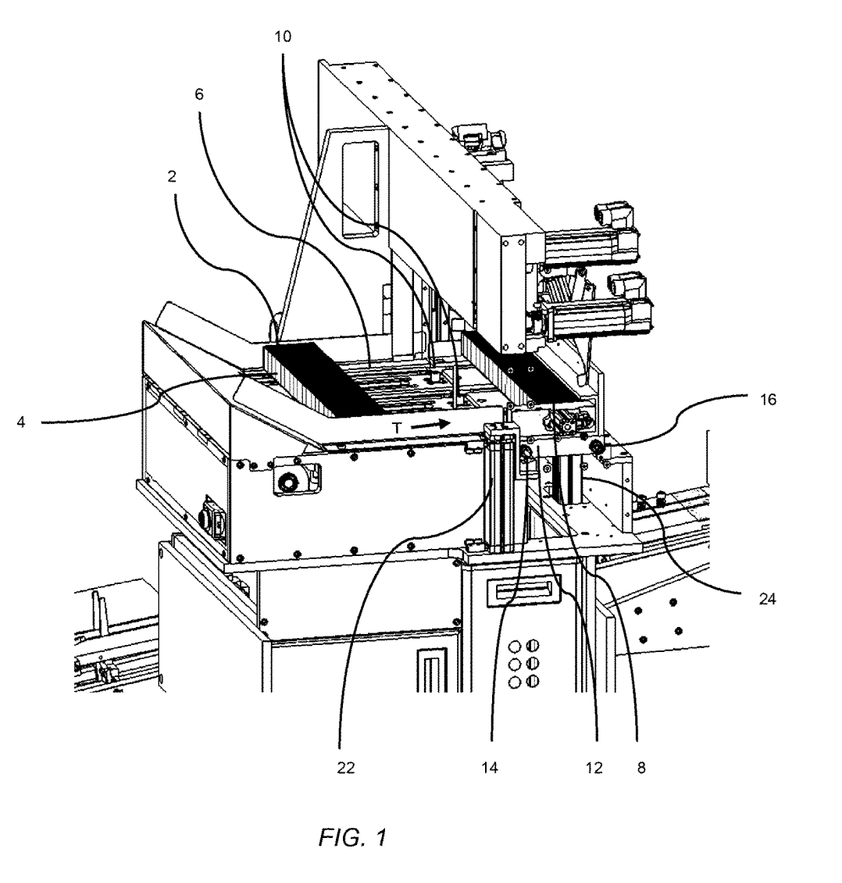
FIG. 1 shows a perspective view of one embodiment of the device according to the invention, from which some of the housing parts have been omitted for the sake of clarity.
Figure 2:
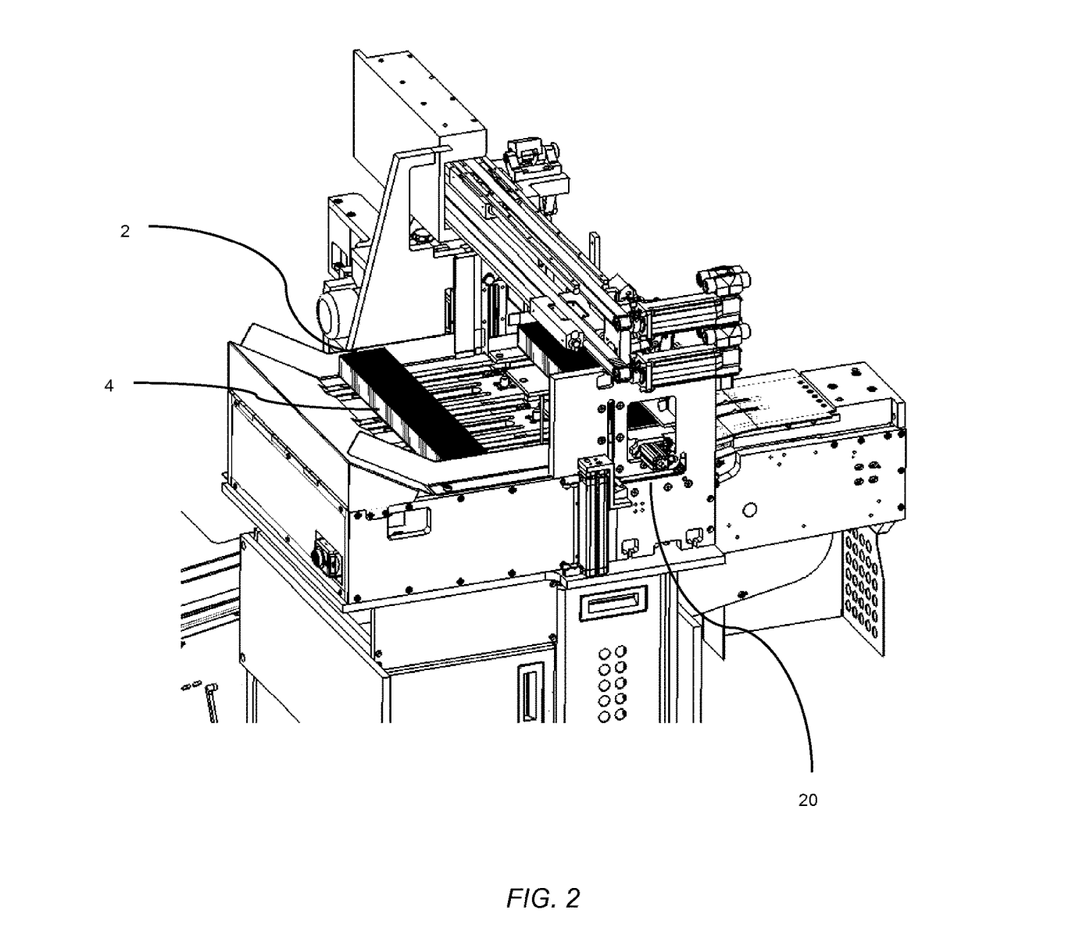
FIG. 2 shows a view like that of FIG. 1, from which other housing parts have been omitted for the sake of clarity.
Figure 3:
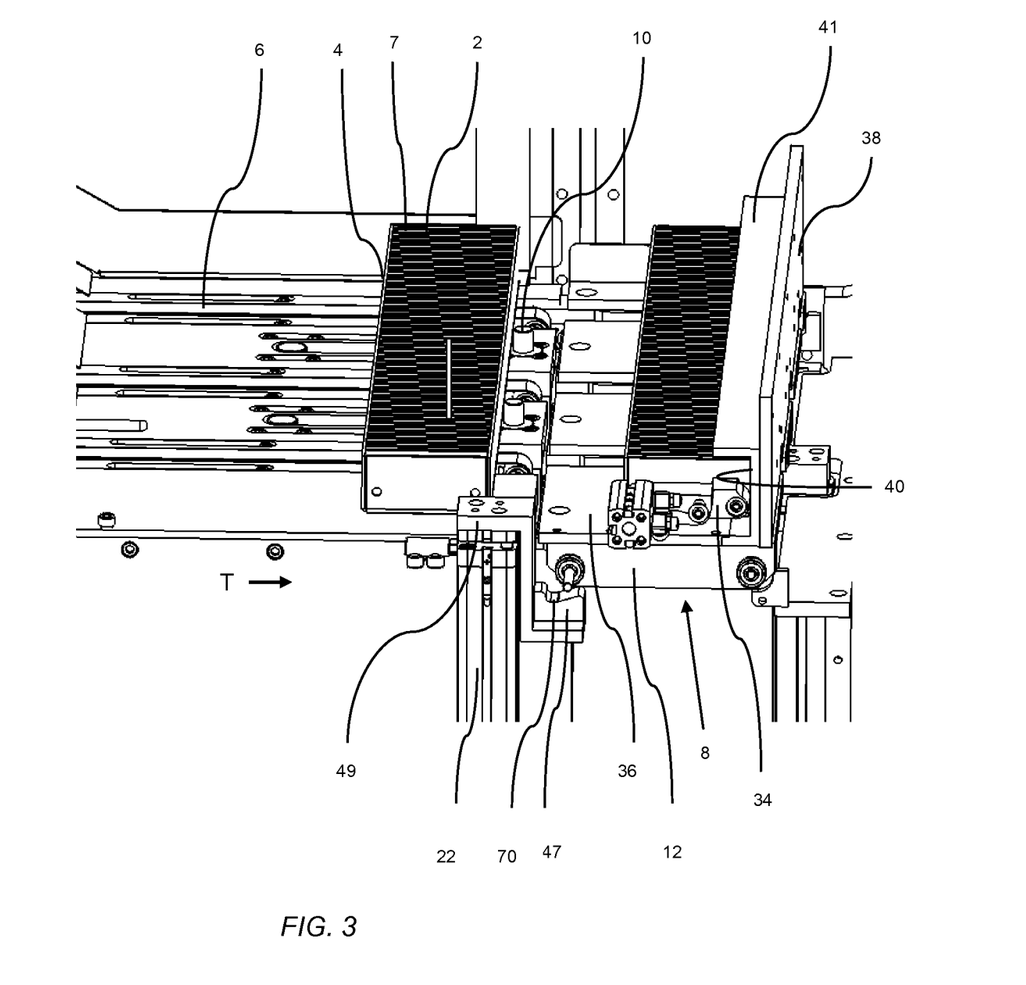
FIG. 3 shows a perspective view of the turning device according to FIG. 1, wherein the slide is in a receiving position.
Figure 4:
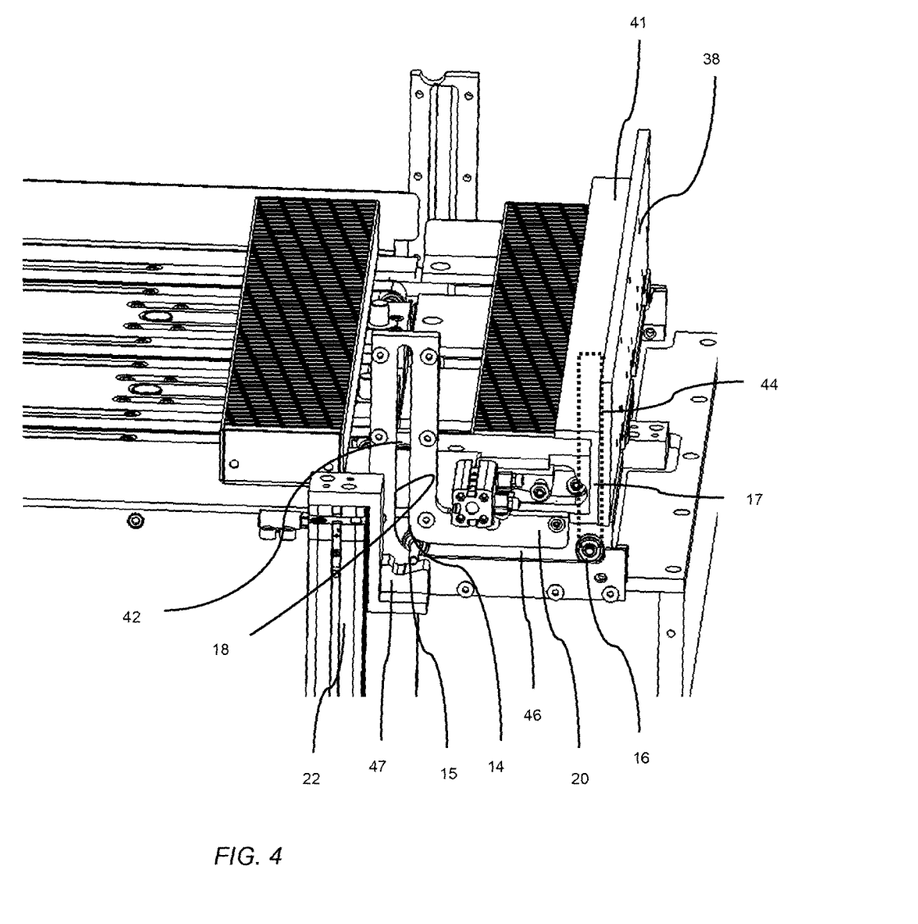
FIG. 4 shows a view like that of FIG. 3 with additional components of the device.

The feed device 6 can be configured in several ways; for example, it can be in the form of a conveyor belt, especially as a storage belt, or as a chute. In a transition area leading to the turning device 8, the feed device 6 comprises stoppers 10, by means of which the trays 4 are held back when the turning device 8 is in operation or already contains a tray 4, as shown in FIGS. 3 and 4. The feed device 6 serves to provide a controlled, continuous supply of trays 4, so that the turning device 8 can be refilled immediately, i.e., as soon as a tray 4 which has just been emptied has been disposed of by the turning device 8 and the turning device 8 is ready to receive another tray 4.

Figure 10:
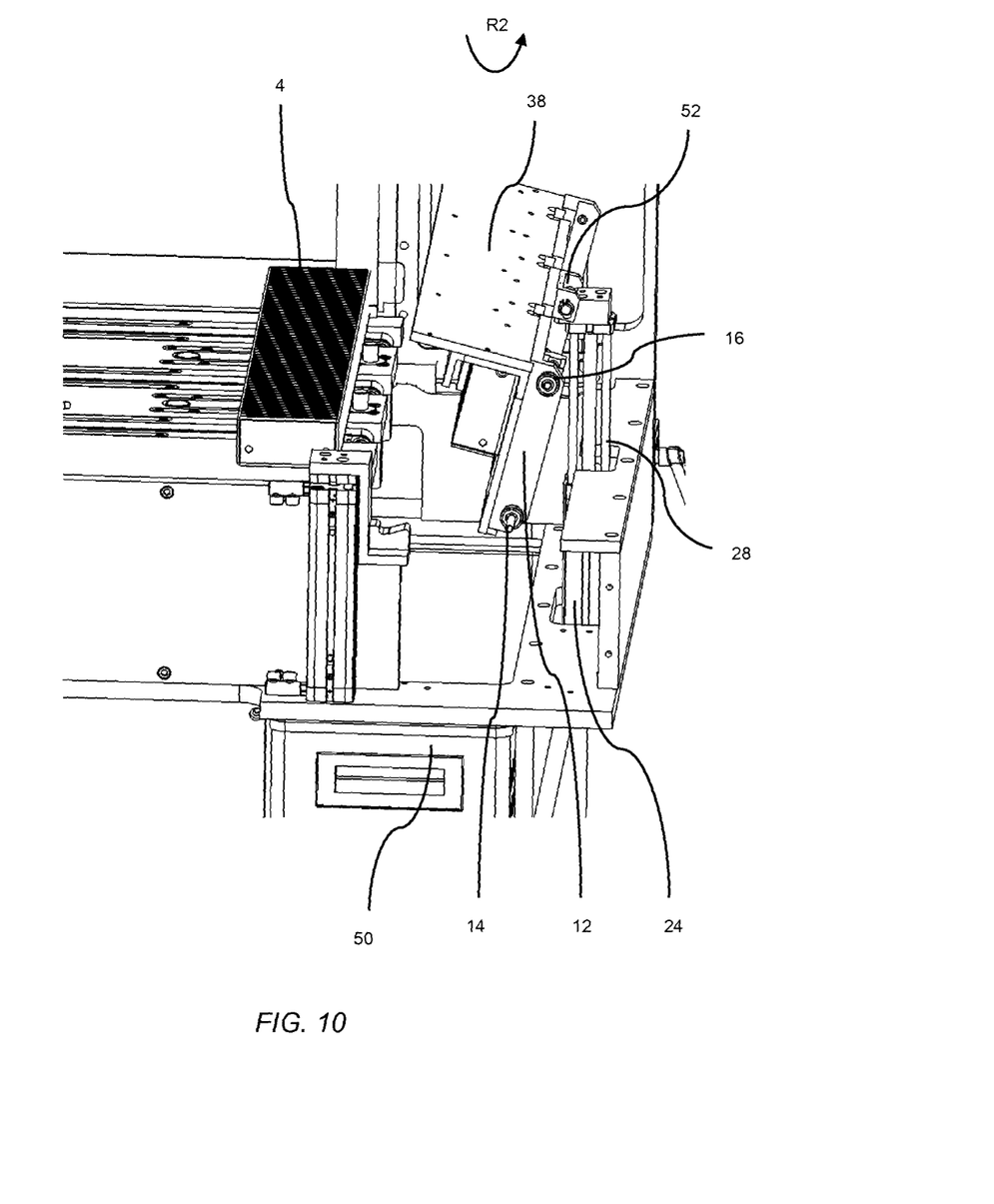
FIG. 10 shows a perspective view of the turning device like that of FIG. 3, with the slide in a disposal position.
Figure 11:
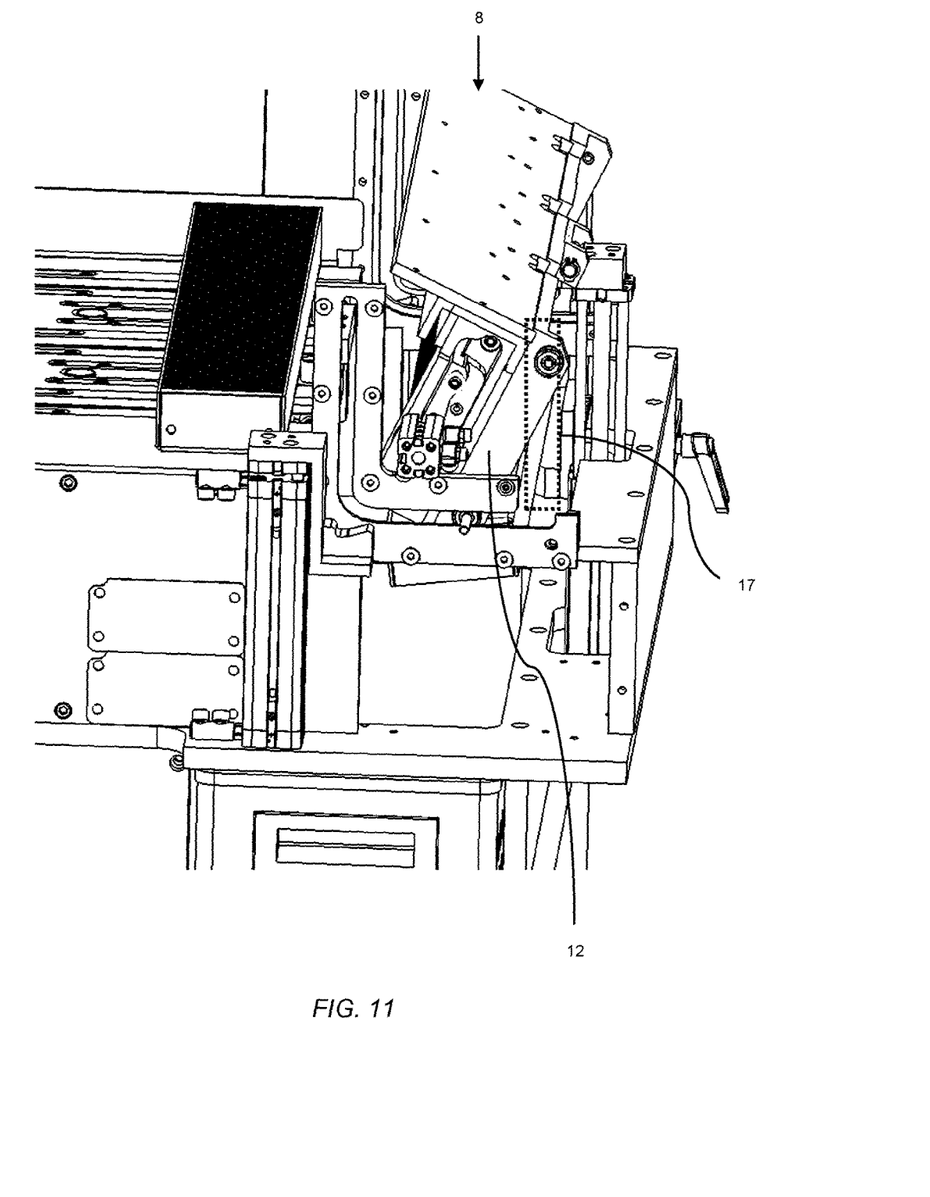
FIG. 11 shows a view like that of FIG. 10 with additional components of the device.

So that the turning device 8 can turn the trays 4, it comprises a slide 12, which is movable back and forth between a receiving position (FIGS. 1-4), an emptying position (FIGS. 7 and 8), and a disposal position (FIGS. 10 and 11). During this movement, the slide 12 is also rotated or tilted. The slide 12 comprises a first guide element 14 and a second guide element 16, which are preferably configured as rollers and by means of which the slide 12 is guided into the individual positions. The guide elements 14, 16 are guided along a substantially U-shaped path 17. This path 17, in the example shown here, is formed in part by a guide cam 18, which is formed as a projection on the inside surface of a lateral plate 20 of the housing of the device (shown only in FIGS. 2, 4, 6, and 11 for the sake of clarity). Any other possible forms of guide elements 14, 16 and guide cams 18 can also be used.

Parts of the path 17, the rest of which is shown in broken line in FIGS. 4 and 11, can be a purely geometric, curved path, along which the guide elements 14, 16 move, without a corresponding guide cam or a correspondingly formed part of the device being present. The path 17 can also proceed in a manner identical to that of the guide cam 18 or be identical to it at least in certain parts, as in the present example.

The rotation of the slide 12 is accomplished by a first drive 22 and a second drive 24. The first drive 22 comprises a first pneumatic cylinder 26, and the second drive 24 comprises a second pneumatic cylinder 28. The first pneumatic cylinder 26 is arranged in an area of the turning device 8 which is close to the feed device 6, and the second pneumatic cylinder 28 is arranged in an area of the turning device 8 which is facing away from the feed device 6. The exact arrangement of the two pneumatic cylinders 26, 28 and how they act on the slide 12 will be described in greater detail further below.

The rotational movement of the slide 12 is accomplished by a substantially alternating back-and-forth movement of the first pneumatic cylinder 26 and of the second pneumatic cylinder 28. So that the individual positions of the slide 12 can be reached, the two drives 22, 24 and thus the two pneumatic cylinders 26, 28 can be actuated independently of each other. In addition to the use of pneumatic cylinders 26, 28, it is also conceivable that other types of linear drives could be used, or that the slide 12 is moved between its end positions by means of a completely different type of drive mechanism.

To empty the trays 4 in the emptying position of the slide 12 (FIGS. 7 and 9), at least one pusher element 30 is provided. In one embodiment, two pusher elements 30, 58 are provided to empty the trays 4. The way in which the pusher elements 30, 58 function will be described in greater detail below with reference to FIGS. 7-9.

FIGS. 3 and 4 show the slide 12 in the receiving position, wherein the slide 12 has already been provided with a tray 4 filled with brochures 2. In the receiving position, the first pneumatic cylinder 26 and the second pneumatic cylinder 28 are in their retracted or inactive position. The slide 12 comprises a lateral boundary element 34 and can thus be adapted quickly and easily to trays of different sizes.

The slide 12 comprises a support surface 36, on which the tray 4 is arranged. A side wall 38 projects at an angle from the support surface 36. In the area of the side wall 38, a receiving pocket 40 is formed, in which the opened tray 4 is accommodated. The receiving pocket 40 is preferably U-shaped. One leg of the U-shaped receiving pocket 40 is formed by a wall 41, which is arranged parallel to the support surface 36 of the slide 12 and at least partially covers the top 7 of the tray 4. The other leg of the U-shaped receiving pocket 40 is formed by the support surface 36 of the slide 12. The base section of the receiving pocket 40 can be formed by the side wall 38 itself. A format cartridge can also be inserted into the slide 12 to form at least certain parts of the receiving pocket 40.

When the slide 12 is in the receiving position, its support surface 36 is arranged at an angle between −20° and +20°, and preferably between −5° and +5°, to the horizontal. As a rule, the angle is preferably 0°.

FIG. 4 shows the first guide element 14 and the second guide element 16 on their substantially U-shaped path 17 with the slide 12 in the receiving position. The U-shaped path 17 comprises a first leg 42 and a second leg 44 and also a straight base section 46. A pin 15, which is connected to the first guide element 14, may project through an opening in the plate 20.

The base section 46 may have a length which is substantially the same as that of the first leg 42. The length of the second leg 44 can be the same as the other lengths, as shown in FIG. 4, but it could also be somewhat shorter, if the disposal position of the slide 12 requires that the slide 12 be tipped by less than 90° to the horizontal. The transition areas between the two legs 42, 44 and the base section 46 may be formed as arcs, so that the first guide element 14 and the second guide element 16 travel from their associated legs 42, 44 to the base section 46 and back again harmoniously and smoothly.

In the example shown here, the guide cam 18 is L-shaped and defines the first leg 42 and the base section 46 of the U-shaped path 17. The second leg 44 of the U-shaped path 18, conversely, proceeds outside the guide cam 18.

When the slide 12 is in the receiving position, the two guide elements 14, 16 are positioned in the transition area between the leg 42, 44 in question and the base section 46.

Figure 5:
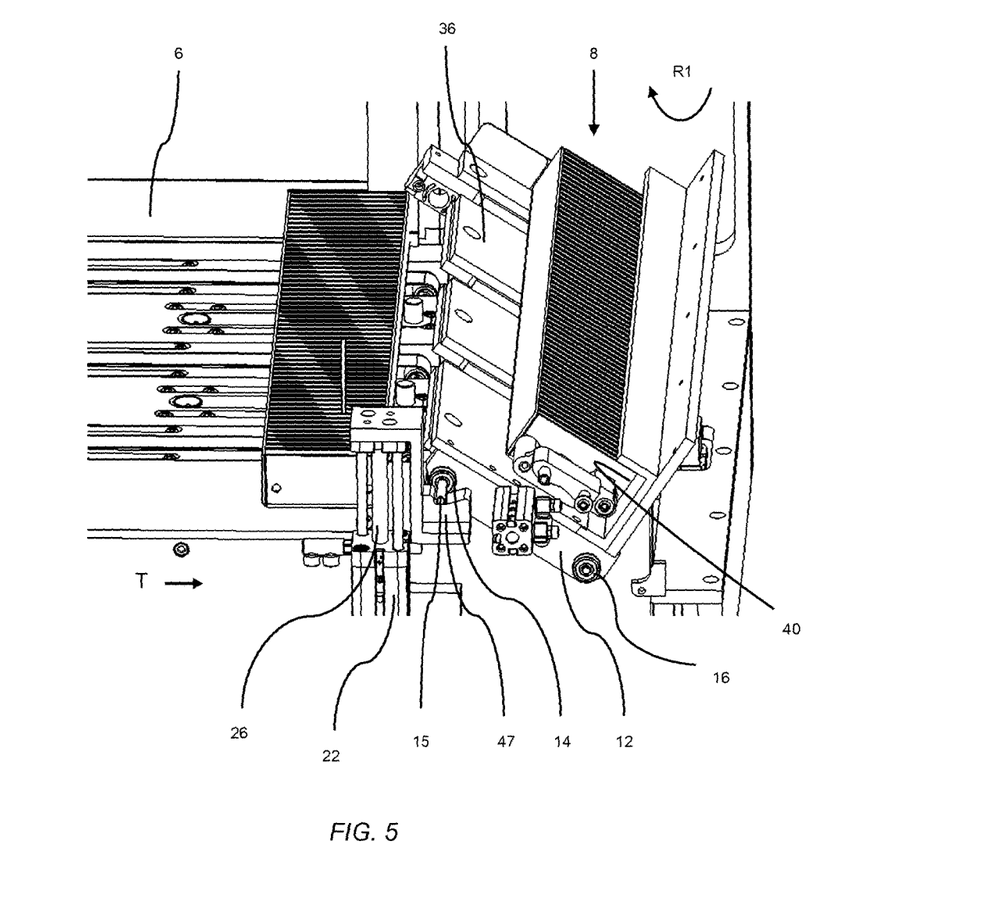
FIG. 5 shows a perspective view of the turning device like that of FIG. 3, wherein the slide has been rotated in a first rotational direction.
Figure 6:
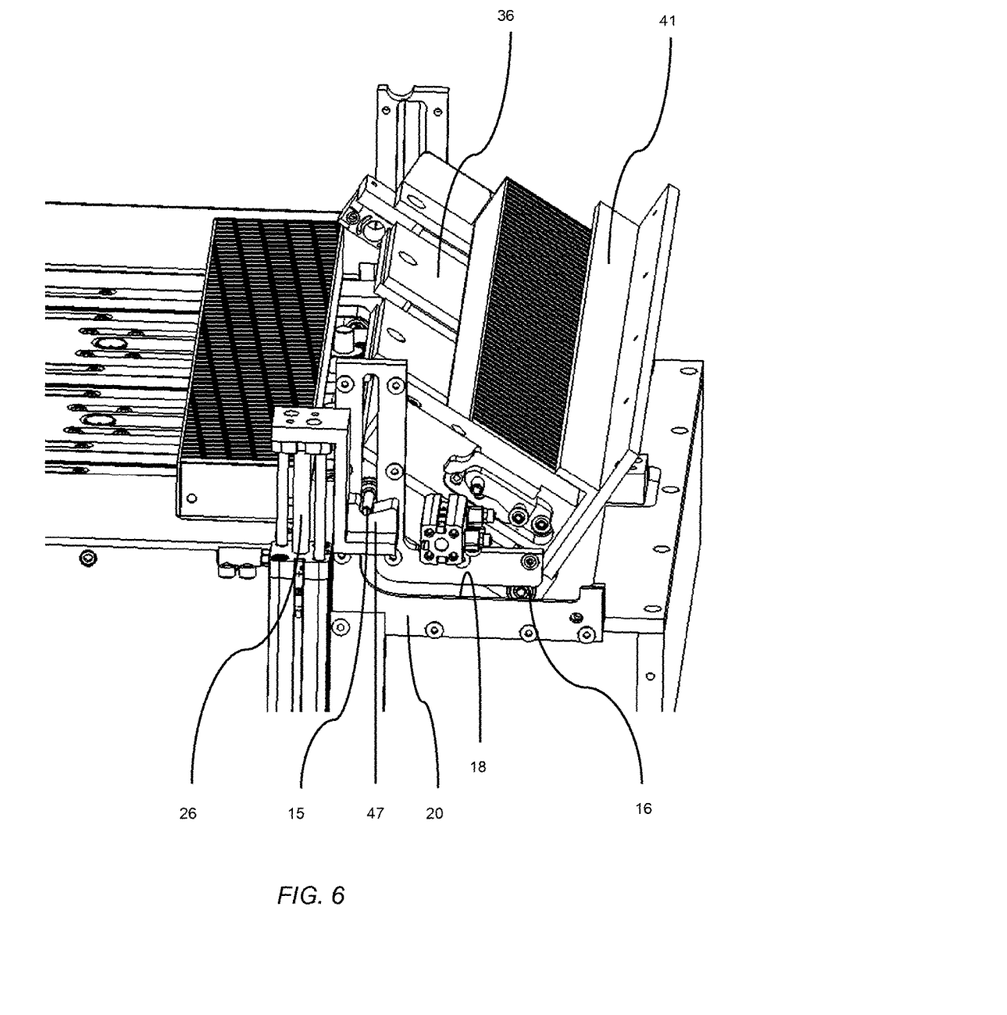
FIG. 6 shows a view like that of FIG. 5 with additional components of the device.

In FIGS. 5 and 6, the slide 12 with the tray 4 has been rotated from the receiving position in a first rotational direction R1. The tray 4 is now held in the receiving pocket 40. The rotation of the slide 12 into the emptying position is achieved by the vertical movement of the first pneumatic cylinder 26. The first pneumatic cylinder 26 may thus move in a direction perpendicular to the transport direction T.

The pin 15 of the first guide element 14 of the slide 12 rests on a support element 47, which is fastened to the first pneumatic cylinder by means of a Z-shaped element 49. Thus, when the pneumatic cylinder 26 moves vertically, the support element 47 carries the pin 15 and thus the first guide element 14 along with it in the vertical direction.

The support element 47 of the first pneumatic cylinder 26 may be arranged on the side of the plate 20 facing away from the turning device 8. It is also conceivable, however, that the support element 47 of the first pneumatic cylinder 26 could be arranged between the plate 20 and the turning device 8. The support element 47 comprises a contoured surface, which comprises a trough 70 (shown in FIG. 3), in which the pin 15 of the first guide element 14 is rotatably accommodated when the slide 12 is being rotated in the first rotational direction R1 from the receiving position to the emptying position. As the movement occurs in the first rotational direction R1, the second drive 24 is in a retracted position, i.e., in an inactive mode. Once the first pneumatic cylinder 26 has been completely retracted again and the slide 12 has moved back into the receiving position, the pin 15 of the first guide element 14 slides easily out of the trough 70.

During the vertical upward movement of the first pneumatic cylinder 26, the first guide element 14 is guided into an end area of the first leg 42 of the path 17. In the emptying position of the slide 12 (FIGS. 7 and 8), the first guide element 14 is then located in this end area of the first leg 42. The second guide element 16 is guided by the raising of the first guide element 14 along the base section 46 of the path 17 from the transition area between the second leg 44 and the base section 46 into the transition area between the first leg 42 and the base section 46.

The slide 12, when in the emptying position (FIGS. 7 and 8), has preferably been rotated by 90° relative to the receiving position. The support surface 36 of the slide 12, when in the emptying position, is thus substantially perpendicular to the transport direction T.

Figure 7:
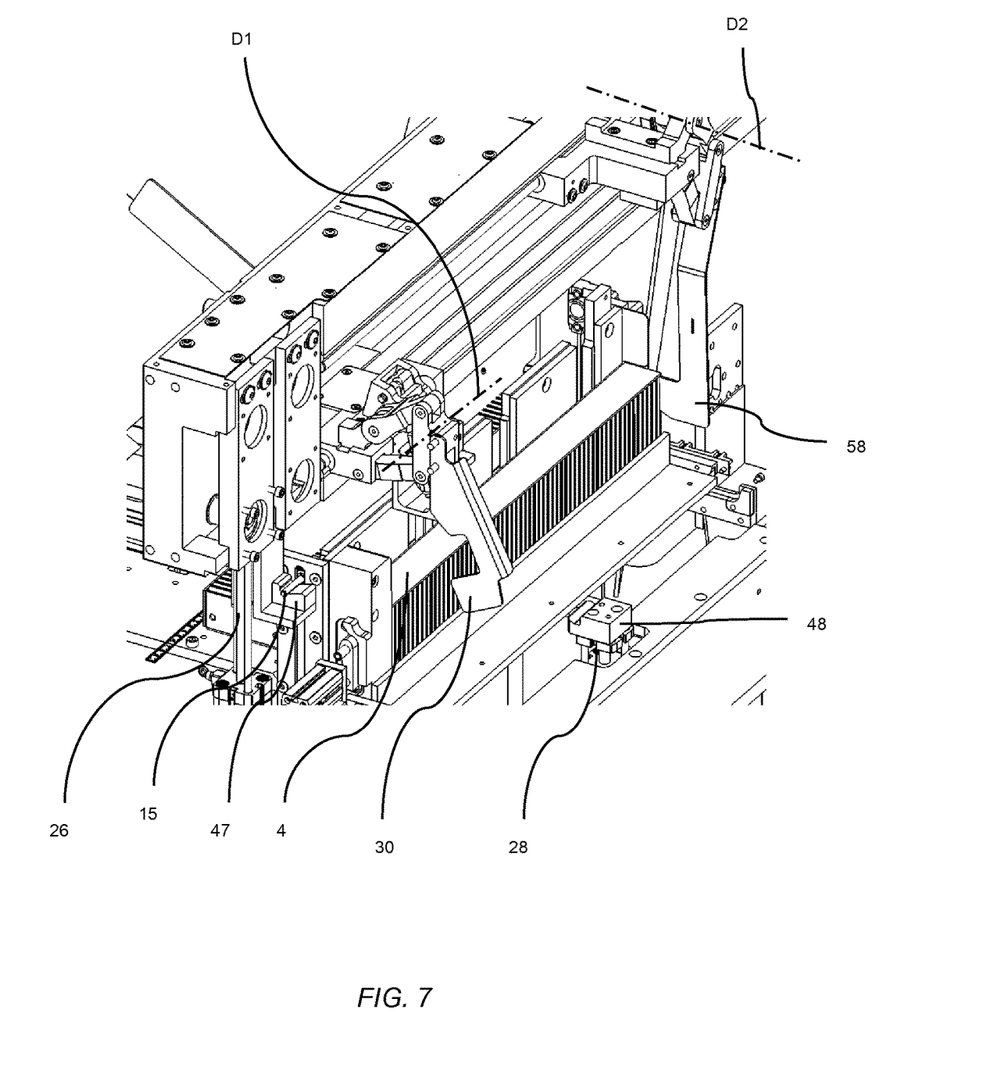
FIG. 7 shows a perspective view of the device of FIG. 2, wherein the slide is in the emptying position, and two pusher elements for pushing out the brochures can be seen.
Figure 8:
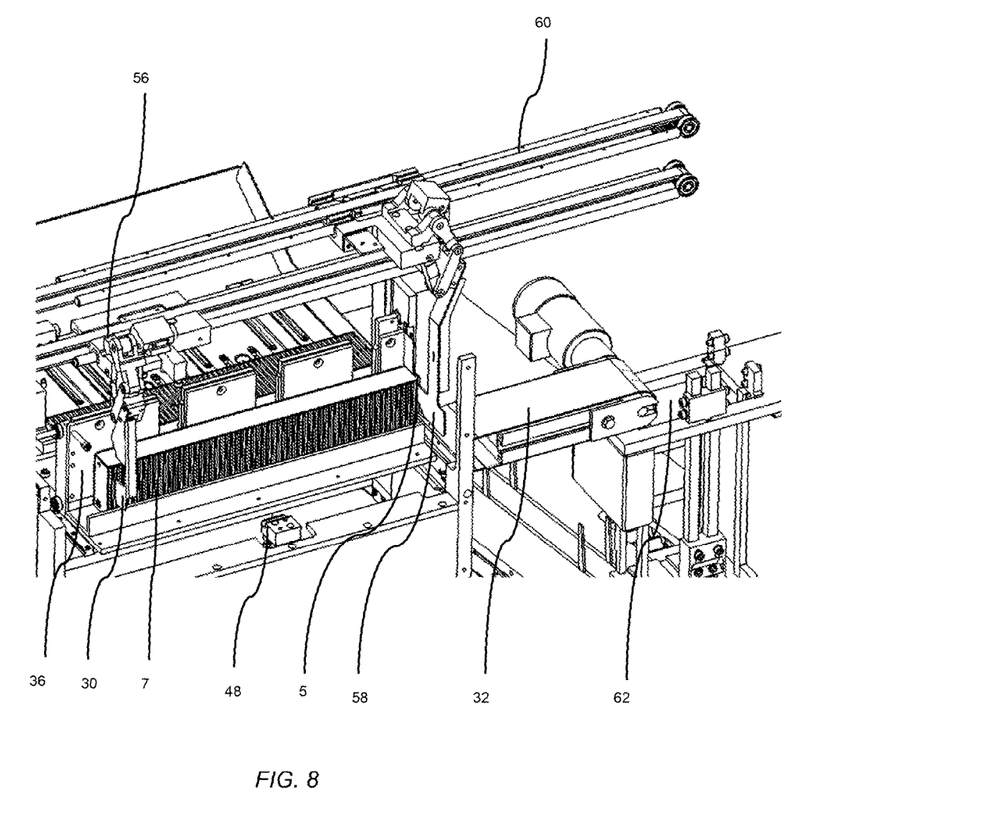
FIG. 8 shows a perspective view of the device like that of FIG. 7, wherein the first pusher element has now been swung into the tray.
Figure 9:
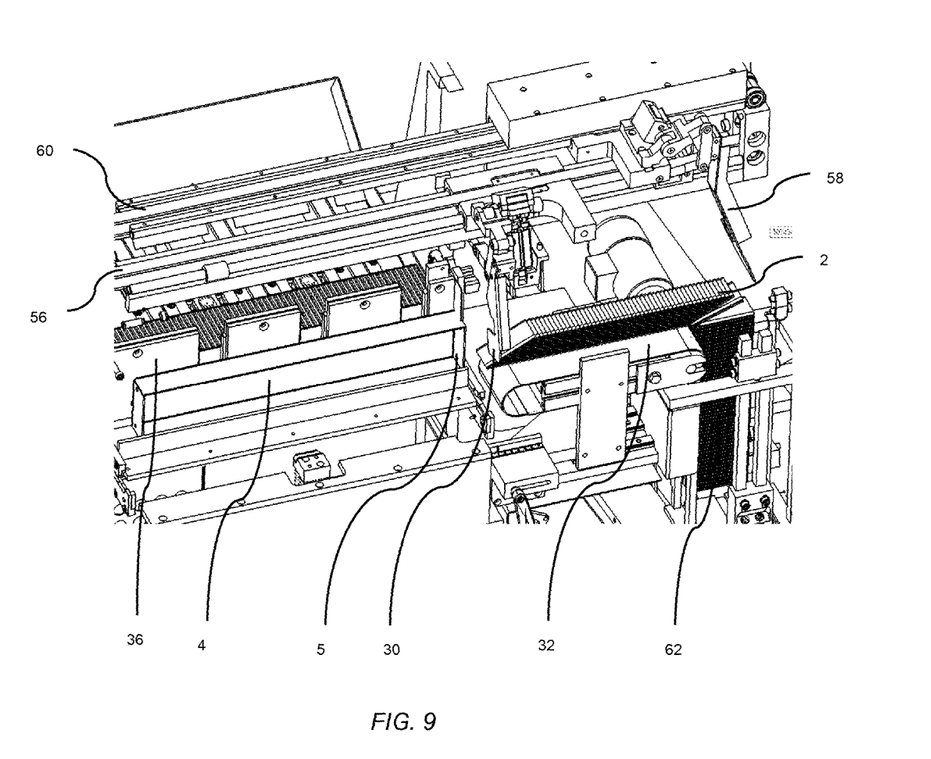
FIG. 9 shows a view like that of FIG. 8, wherein the pusher elements have pushed the brochures out of the tray.

With reference to FIGS. 7-9, it is possible to see that the device comprises two pusher elements 30, 58, wherein the first pusher element 30 is guided on a first guide rail 56, the second pusher element 58 on a second guide rail 60. The two pusher elements 30, 58 are movable back and forth along the two guide rails 56, 60 transversely to the transport direction T. The first pusher element 30 is rotatable around first rotational axis D1, which is substantially perpendicular to the transport direction T of the feed device 6. The second pusher element 58 is rotatable around a second rotational axis D2, which is substantially parallel to the transport direction T of the feed device 6.

Before the slide 12 reaches the emptying position, the first pusher element 30 is flipped all the way out (FIG. 7). This means that the pusher element 30 is outside the area through which the tray 4 travels. During the rotation of the slide 12 from the receiving position to the emptying position, the second pusher element 58 is flipped downward and thus assumes a support function for the brochures 2 at the open narrow side 5 of the tray 4, so that no brochures 2 can fall out of the tray 4 during the rotation process. As soon as the slide 12 with the tray 4 to be emptied has been rotated to the emptying position, the first pusher element 30 flips down into a second position, where it projects into the open top 7 of the tray 4 next to the outermost brochure 2 (shown in FIG. 8). The second pusher element 58 remains, as before, in its flipped-down position, preventing the brochures 2 from falling out of the open narrow side 5.

A pushing movement of the first pusher element 30 and of the second pusher element 58 along the guide rails 58, 60 has the effect of emptying the tray 4 filled with brochures 2. In FIG. 9, the pushing process by the pusher elements 30, 58 has already been completed.

The brochures 2 are pushed out of the tray 4 in the direction toward a conveying means 32. The conveying means 32 is preferably a belt, which carries the brochures 2 in a direction transverse to the transport direction T. By flipping up the second pusher element 58 and by moving the conveying means 32 forward, the brochures 2, which are arranged perpendicularly to the conveying means 32, drop onto the conveying means 32 in such a way as to form a fish-scale pattern and can then be moved in a horizontal position, for example, into a shaft 62 (FIG. 9).

After the tray has been emptied, the slide 12 is moved from the emptying position to the disposal position, to accomplish which it passes through the receiving position. FIGS. 10 and 11 show the slide 12 in the disposal position, in which the slide 12 has been rotated preferably 60-90° in a second rotational direction R2 relative to the receiving position. The slide 12, when in the disposal position, has been rotated to such an extent that the empty tray 4 falls or slides out of the receiving pocket 40 and slides into a container 50. The container 50 is set up underneath the turning device 8.

As previously mentioned, the first pneumatic cylinder 26, when the slide is in the emptying position, is located in an extended position and the second pneumatic cylinder 28 is in a retracted position. To arrive in the disposal position, the slide 12 must first be rotated back into the receiving position. This is done by lowering, i.e., retracting, the first pneumatic cylinder 26, so that the second guide element 16 is guided back into the transition area between the second leg 44 and the base section 46 of the path 17. The first guide element 14 is simultaneously guided back from the end area of the first leg 42 into the transition area between the first leg 42 and the base section 46 of the path 17. As soon as the first pneumatic cylinder 26 has been pulled completely back in, the second pneumatic cylinder 28 begins its vertical upward movement. The second guide element 16 is guided along the second leg 44 of the U-shaped path 17 and, when the slide is in the disposal position, is positioned in an end area of the second leg 44. The first guide element 14 is guided along the base section 46 of the U-shaped path 17 into the transition area between the second leg 44 and the base section 46 or at least to a point close to that section.

The second pneumatic cylinder 28 is connected to a support element 48, which holds a rod 52, which is arranged on the slide 12 in the transition area between the support surface 36 and the side wall 38 of the slide 12.

When the second pneumatic cylinder 28 moves upward, the support element 48 of the second pneumatic cylinder 28 carries the rotatably supported rod 52 along with it. Because of the vertical movement of the second pneumatic cylinder 28, the slide 12 is rotated in the second rotational direction R2 until the disposal position is reached. The first pneumatic cylinder 26 remains passive during this phase.

After the tray 4 has been transferred to the container 50, the slide 12 is guided back into the receiving position (moving in rotational direction R1). This done by lowering the second pneumatic cylinder 28. When the slide is in the receiving position, the rod 52 has also become disconnected from the support element 48 again. The slide is now ready to accept another tray 4 from the feed device 6.

It is also possible to provide several support elements 47, attached to both sides of the slide 12, so that the slide 12 will be lifted in symmetric fashion. Several support element 48 can also be provided, and may be arranged symmetrically with respect to the center axis of the slide 12. In addition to support elements 47, 48 and pins 15 and rods 52, there also exist many other disconnectable mechanisms for coupling the drives 22, 24 to the slide 12, which the person skilled in the art will be able to recognize.

The invention claimed is:

1. A method for receiving, emptying, and then disposing of trays filled with brochures, comprising:
   feeding a filled tray in a transport direction to a slide of a turning device, the turning device located in a receiving position;
   subsequently rotating the slide in a first rotational direction by 60-120° around a rotational axis substantially perpendicular to the transport direction to an emptying position and emptying the tray filled with brochures by pushing the brochures out of an open end of the tray in a direction substantially perpendicular to the transport direction;
   subsequently, after the tray has been emptied, rotating the slide from the emptying position to a disposal position by rotating the slide from the emptying position, with the empty tray still arranged on the slide around said rotational axis substantially perpendicular to the transport direction back in a second rotational direction opposite the first rotational direction and further in said second rotational direction around the same rotational axis, around which the slide was rotated from the emptying position back to the receiving position, past the receiving position to said disposal position, the slide thus having been rotated by 45-110° in the second rotational direction relative to the receiving position, so that the emptied tray falls from the slide; and
   subsequently rotating the slide in the first rotational direction back to the receiving position.

2. The method of claim 1, wherein, when the slide is in the receiving position, a support surface of the slide is arranged at an angle between 20° and +20° to the horizontal to receive a tray.

3. The method of claim 1, wherein the slide, when in the emptying position, has been rotated in the first rotational direction by 85-95° relative to the receiving position.

4. The method of claim 1, wherein the slide, when in the disposal position, has been rotated in the second rotational direction by 60-90° relative to the receiving position.

\* \* \* \* \*